US005761330A

United States Patent [19]
Stoianov et al.

[11] Patent Number: 5,761,330
[45] Date of Patent: Jun. 2, 1998

[54] HYBRID OPTICAL-DIGITAL METHOD AND APPARATUS FOR FINGERPRINT VERIFICATION

[75] Inventors: Alexei Stoianov, Toronto; Colin Soutar, Scarborough; George J. Tomko, East York, all of Canada

[73] Assignee: Mytec Technologies, Inc., Don Mills, Canada

[21] Appl. No.: 482,404

[22] Filed: Jun. 7, 1995

[51] Int. Cl.$^6$ .............................. G06K 9/80; G06K 9/78
[52] U.S. Cl. .................................................. 382/127
[58] Field of Search ........................ 382/124, 280, 382/116, 125, 126, 127; 356/71

[56] References Cited

U.S. PATENT DOCUMENTS

| | | | |
|---|---|---|---|
| 3,716,301 | 2/1973 | Caulfield et al. | 382/124 |
| 3,873,970 | 3/1975 | McMahon et al. | 382/124 |
| 4,876,725 | 10/1989 | Tomko | 382/124 |
| 5,042,073 | 8/1991 | Collot et al. | 382/3 |
| 5,050,220 | 9/1991 | Marsh et al. | 382/124 |
| 5,159,474 | 10/1992 | Franke et al. | 359/29 |

OTHER PUBLICATIONS

Applied Optics, vol. 31, No. 8, 10 Mar. 1992, pp. 1126-137, Kotzer T et al: "Phase Extraction Pattern Recognition".
Applied Optics, vol. 33, No. 14, May 10, 1994, pp.3070–3075, A. Carnicer et al.: Controlled–Intensity Detection Peaks in a Binary Joint Transfform Correlator.
Optical Engineering, vol. 30, No. 12, Dec. 1 1991, pp. 1958–1961, Fielding K.H. et al.: "Optical Fingerprint Identification by Binary Joint Transform Correlation".

*Primary Examiner*—David K. Moore
*Assistant Examiner*—Brian P. Werner
*Attorney, Agent, or Firm*—Fish & Richardson P.C.

[57] ABSTRACT

A hybrid optical-digital technique is provided for automatic fingerprint verification. A coherent optical beam modulated with the characteristics of a fingerprint image passes through the lens performing an optical Fourier transform. The intensity array that represents the Fourier power spectrum is recorded and processed. In enrolment, several arrays related to the same finger are captured and processed. A template which is unique for each fingerprint is generated and stored. Using the set of arrays captured in enrolment and a set of templates from a standard database, the processor calculates dependences of false rejection rate and false acceptance rate upon a metric of comparison. The metric is obtained by calculating a relative distance between two arrays in Hilbert space. An individual threshold of verification for a person to be enroled is set and stored together with the template. In verification, the metric of comparison between the processed array derived from a fingerprint to be verified and the pre-stored template is determined and compared with the pre-stored individual threshold.

18 Claims, 1 Drawing Sheet

HYBRID OPTICAL-DIGITAL METHOD AND APPARATUS FOR FINGERPRINT VERIFICATION

BACKGROUND OF THE INVENTION

This invention relates to fingerprint verification, specifically to a hybrid, i.e. optical/digital processing method and apparatus for comparing an input fingerprint image with a previously recorded template of the fingerprint. In the following, "template" means unique information extracted from a fingerprint image.

Various automatic techniques for identifying individuals through their fingerprint images have been proposed in the prior art. Most of them deal with either digital or optical processing. The digital methods usually compare minutiae of a fingerprint to be verified with the minutiae of previously recorded prints. Such techniques are time-consuming and expensive. Another disadvantage of digital methods is the inconsistency of the fingerprint minutiae due to cuts, abrasions, wear, etc. which leads to a lower accuracy of verification.

In general, the optical processing methods are based on correlation techniques wherein a light beam carrying information about a fingerprint to be verified passes through a spatial filter representing data related to the template of a known print. In the output of the system, a correlation signal (which is the evidence of verification) is obtained. The template can be generated digitally by performing the Fourier transform of a fingerprint image which has been captured during enrolment of the individual. In verification, the template is displayed on a spatial light modulator (SLM) which is placed in the Fourier transform plane of the input fingerprint image to be verified, where the Fourier transform in this case is performed by optical means. The main advantage of the optical correlation methods is that the verification takes place in a real time, since both the optical Fourier transforms required for the correlation operation are performed at the speed of light, and the time of verification is limited only by the response times of the electronic apparatus and the SLM. The optical methods deal with the whole fingerprint, not with minutiae, so a damage of the fingerprint does not dramatically reduce a probability of verification.

However, the optical methods have some disadvantages. The optical devices are quite cumbersome and expensive; the most widely used type of SLM—liquid crystal display—is subject to a thermal instability and degradation. Furthermore, the filter which has been produced digitally does not exactly match the Fourier transform which is produced optically. The fingerprint images may also exhibit a poor consistency because of rotation and deformation of a finger on an input device. Unless a sophisticated detection algorithm is used, this can lead to high false acceptance and false rejection rates.

SUMMARY OF THE INVENTION

In accordance with the present invention, there is provided a hybrid optical/digital fingerprint enrolment apparatus comprising: a source of coherent light for providing an illuminating beam along a beam path; an input in said beam path for producing an optical signal carrying information about a fingerprint of a user along an optical signal path; optical Fourier transform apparatus in said optical signal path for obtaining a Fourier spatial spectrum of said optical signal; means for obtaining a digitised distribution related to a two-dimensional intensity distribution of said Fourier spatial spectrum; means for storing said intensity-related distribution as one of a set of intensity-related distributions for said user; means for storing a set of comparator template distributions; means for deriving a fingerprint template distribution from said set of intensity-related distributions; means for choosing at least two intensity-related distributions in said set of intensity-related distributions; means for calculating a metric of comparison between each chosen intensity-related distribution and at least two comparator template distributions in said set of comparator template distributions; means for calculating said metric of comparison between each distribution in said set of intensity-related distributions which was not used for generation of the fingerprint template distribution and said fingerprint template distribution; means, responsive to said means for calculating a metric of comparison between each chosen intensity-related distribution and at least two comparator template distributions and responsive to said means for calculating said metric of comparison between each distribution in said set of intensity-related distributions which was not used for generation of the fingerprint template distribution and said fingerprint template distribution for deriving a user dependent threshold of verification; and means for storing said fingerprint template distribution and said user dependent threshold of verification.

In accordance with another aspect of this invention, there is provided a hybrid optical/digital method of fingerprint enrolment comprising the steps of: (a) obtaining an optical signal modulated with characteristics of a user's fingerprint; (b) obtaining an optical Fourier spectrum of said optical signal; (c) obtaining an array related to a two-dimensional intensity distribution of said Fourier spectrum; (d) repeating steps (a) to (c) at least twice for said user's fingerprint in order to obtain a set of intensity-related arrays; (e) retrieving a set of comparator template arrays; (f) choosing at least two intensity-related arrays in said set of intensity-related array and each comparator template array in said set of comparator template arrays; (g) calculating a metric of comparison between each chosen intensity-related array and each comparator template array in said set of comparator template arrays; (h) generating a fingerprint template array from said set of intensity-related arrays; (i) calculating said metric of comparison between each array in said set of intensity-related arrays which were not used for generation of the fingerprint template array and said fingerprint template array; (j) determining a user dependent threshold of verification based on step (g) and step (i), and (k) storing said user dependent threshold of verification.

Simulation experiments with real fingerprint images demonstrate good performance of the present invention.

BRIEF DESCRIPTION OF THE DRAWINGS

In the drawings which illustrate an example embodiment of the invention.

DESCRIPTION OF THE PREFERRED EMBODIMENTS

Figure 1:
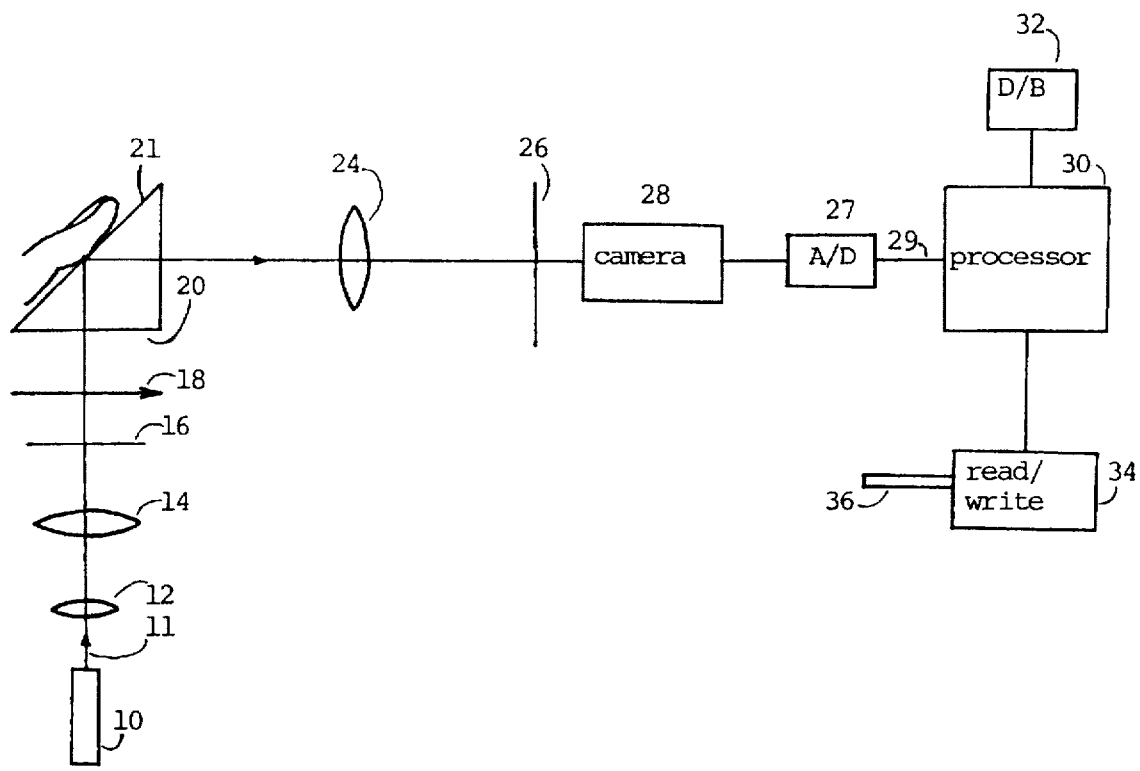
FIG. 1 is a schematic illustration of a hybrid system for fingerprint verification made in accordance with the invention.

In FIG. 1, a fingerprint recognition system in accordance with the present invention comprises a source of coherent light 10 which directs a light beam 11 through an expander lens 12, a collimating lens 14, an attenuator 16, and a polarizer 18 to the input prism 20. Satisfying the conditions of total internal reflection at the surface 21 of the prism, the light is reflected and then it is collected by Fourier transform lens 24 and focused through a spatial filter 26 onto a camera 28 of the type which registers a two-dimensional intensity array, such as a CCD camera or a CMOS camera, an analog-to-digital converter 27 having a digital output 29 to a digital processor 30. The latter is connected with a card read/write device 34, which may receive a card 36, and with database 32 containing standard comparator template arrays.

Placing a finger onto the prism surface 21 causes frustration of the total internal reflection, so that the reflected beam is modulated with information relating to the fingerprint image. The polarizer 18 is set to obtain light polarized in the plane of incidence, because the extent of the frustration of the total internal reflection is higher for this type of polarization. This will improve the contrast of said fingerprint image. The lens 24 (or an optical system consisting of a series of lenses) performs a spatial Fourier transform of the input image, and a camera 28 measures the two-dimensional intensity distribution of this Fourier spectrum. The spatial filter 26 placed in front of camera 28 eliminates spatial frequencies in the Fourier spectrum which do not carry any useful information about the fingerprint.

In another embodiment, the spatial filter 26 is a nonlinear device which has a transmittance that saturates as the intensity of incident light increases. This will enhance the use of the available dynamic range of the camera 28, and will cut down on the processing time required. In one embodiment, the said nonlinear device consists of a liquid crystal layer sandwiched between two photoconductive plates.

The method of this invention is based on the fact that a two-dimensional intensity distribution of the Fourier spectrum of a fingerprint is unique for each individual almost to the same extent as the original fingerprint. Therefore, for fingerprint recognition, it may not be necessary to use both the amplitude and phase information of the complex Fourier spectrum, as in the case of many optical correlation systems. Also, operating with intensity in the Fourier domain instead of the spatial domain retains the translational invariance of the device. Performing the Fourier transform optically significantly reduces the time required for verification when compared with entirely digital systems.

The method of enrolment of a person comprises several steps. The person places his/her finger onto the prism surface 21, and camera 28 digitally registers the two-dimensional intensity array, $I_{ik}$, of a Fourier spectrum related to this fingerprint. The digitized array $I_{ik}$ is directed to a processor 30 which performs the remainder of the operations.

It has been found that the consistency of Fourier spectra of fingerprints is quite poor, so both intensity and phase distributions of the same finger placed on prism surface 21 repeatedly will fluctuate from image to image. On the other hand, the positions of peaks in the spectrum are more stable than their relative intensities. To improve the consistency of the intensity spectrum, the processor 30 performs an initial treatment of said spectrum as follows. The array $I_{ik}$ is transformed into a new, intensity-related, array, $a_{ik}$. The two arrays ($I_{ik}$ and $a_{ik}$) are connected with a functional dependence:

$$a_{ik} = f(I_{ik}) \tag{1}$$

One of the possible realizations of this dependence is an exponential saturation function:

$$f(I_{ik}) = 1 - \exp(-I_{ik}/\alpha I_{av}), \tag{2}$$

where $I_{av}$ is the intensity averaged over the array $I_{ik}$ and $\alpha$ is a dimensionless parameter usually lying between 1 and 3.5.

In another embodiment, the function f performes binarization:

$$f(I_{ik})=1, \ I_{ik}/I_{av} > \alpha; \ f(I_{ik})=0, \ I_{ik}/I_{av} < \alpha; \tag{3}$$

or this is a saturation function with an offset:

$$f(I_{ik})=1, \ I_{ik}/I_{av} > \alpha; \ f(I_{ik})=I_{ik}/I_{av}, \ I_{ik}/I_{av} < \alpha \tag{4}$$

After processing the array $I_{ik}$ in accordance with one of Eqs. (1)–(4) the resulting array $a_{ik}$ exhibits higher consistency than the initial array $I_{ik}$.

If the spatial filter 26 is a nonlinear device, the initial processing of $I_{ik}$ with a saturation function to obtain the intensity-related array $a_{ik}$ is performed optically which will reduce the processing time.

The next step involves repeating the steps which have been just described. This means that the individual places the same finger onto the prism a few times, so that corresponding arrays $a_{ik}$ are obtained. In many cases it is quite sufficient that the number of these arrays be between eight and ten.

The next step comprises generating a fingerprint template array, $a'_{ik}$, specific to the individual. This is done by means of averaging at least three arrays $a_{ik}$ from the set of arrays obtained in the previous step. In the preferred embodiment, three arrays are chosen such that the average value of the elements in one of the three is the maximum value as compared with the average value of the elements in each of the other arrays, the average value for the second is the minimum average value, and for the third, the median average value. After generating the fingerprint template array $a'_{ik}$, the three arrays $a_{ik}$ which were used are excluded from the further processing, so that the set of remaining arrays $a_{ik}$ will contain N arrays.

The next step comprises calculating a metric of comparison, K, between said fingerprint template array $a'_{ik}$ and each of the N arrays $a_{ik}$ which were not used to generate the template. In the preferred embodiment, the metric K corresponds to the relative distance between two arrays ($a'_{ik}$ and $a_{ik}$) in Hilbert space (see, for example, S. K. Berberian, Introduction to Hilbert Space. London: Oxford University Press, 1961):

$$K=1-\|a_{ik}-a'_{ik}\|/(\|a_{ik}\|+\|a'_{ik}\|), \tag{5}$$

where $\|a_{ik}\|$ is a norm in Hilbert space. For example, this norm may be defined as $$\|a_{ik}\|=(\Sigma(a_{ik})^p)^{1/p}, \ p=1, 2, \ldots \tag{6}$$

The values K lie between 0 and 1 with K=1 corresponding to a perfect match. Having calculated the values K for each array $a_{ik}$, the processor sorts the set of K in ascending order to produce the set $\{K_1, K_2, \ldots, K_N\}$. The so-called false rejection rate (FRR) for each element, $K_i$, in the set is taken as the number, i, of the element $K_i$ divided by the total number of elements, N. The FRR versus K may then be plotted by interpolating between points, as shown in FIG. 2.

The next step deals with a calculation of so-called false acceptance rate (FAR). This step utilises the comparator template arrays $a^d_{ik}$ of database 32 which correspond to people's fingerprints different from the fingerprint being enroled. The same metric K is calculated to judge the match between said N arrays $a_{ik}$ and some comparator template arrays which have been randomly picked from the database 32. The obtained values of K are sorted in descending order to obtain the set $\{K^d_1, K^d_2, \ldots K^d_M\}$. The number, j, of each element, $K_j$, in the resulting set is divided by the total number of trials, M, so that the processor receives the dependence of FAR upon the threshold of verification K, as shown in FIG. 2.

Figure 2:
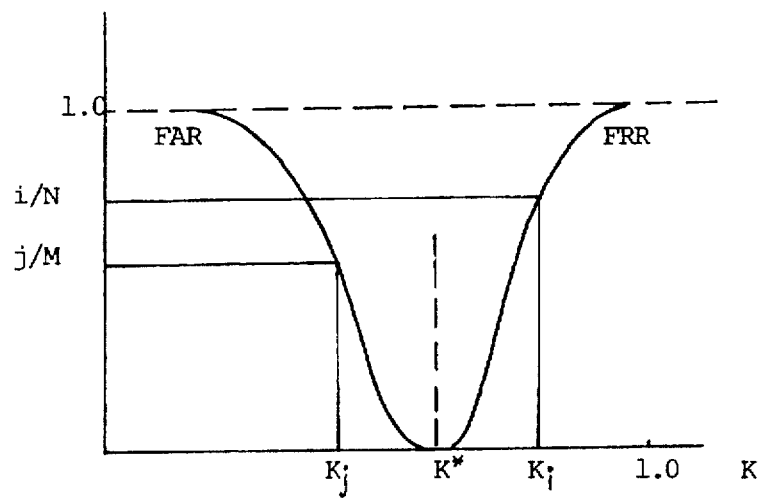
FIG. 2 represents typical dependencies of false acceptance and false rejection rates versus a threshold parameter.

Referring to FIG. 2, the next step compares the computed dependencies FRR and FAR. In most cases there is a bandgap between FAR and FRR, so that the processor picks an individual threshold of verification, K*, inside the bandgap. If the dependencies FAR and FRR intersect each other, the processor picks the individual threshold of verification, K*, either to the left or to the right of the point of intersection depending on which is more important—low FRR or low FAR.

Finally, the card read/write device 34 stores said template $a'_{ik}$ and said individual threshold of verification K* on a card 36, such as an optical card or a smart card. In general device 34 could utilise any storage medium, such as a central database, etc. Enrolment is now complete.

In verification, a person to be verified places his/her finger onto the prism surface 21, and array $a^v_{ik}$ is obtained from an intensity array $I^v_{ik}$ (registered by CCD camera) in the same manner as it has been done in enrolment. The pre-stored template (i.e. array $a'_{ik}$) related to the fingerprint to be verified, as well as the pre-stored individual threshold K* are read from the storage/readout device 34. Then the processor calculates the metric of comparison, K$^v$, between said array $a^v_{ik}$ and said pre-stored template $a'_{ik}$. If said value of K$^v$ is higher than said pre-stored individual threshold K*, the verification is obtained. The time of verification is short because the longest part of process (i.e., the Fourier transform) is performed by the lens 24.

In a second embodiment of the invention, another method of processing is used. The processor scans over the array $I_{ik}$ to find positions and intensities of a certain number, m, of the highest peaks in the spectrum. Usually m is about eight to twelve. Then the intensities of these peaks are processed with a function f which is the same as in Eq.1 (preferably, f is the exponential saturation function from Eq.2), so that an intensity-related array $a_j$, j=1, 2, . . . m, is obtained. Then coordinates of the peaks are transformed to a polar coordinate system ($\rho$, $\psi$), the center $\rho$=0 of which corresponds to the zeroth spatial frequency in Fourier domain. Finally, an array $\{b_j\}$ is derived from the initial intensity array $I_{ik}$. Each j-th element of the array $\{b_j\}$ is a 3D vector comprising the polar coordinates of the peaks and their processed intensities $a_j$, so that $b_j=(\rho_j, \psi_j, a_j)$.

In enrolment, the next step involves obtaining a few arrays $\{b_j\}$ by placing the same finger onto the prism a few times and repeating the procedure which has been just described. Then one of these arrays, $\{b_j'\}$, is picked as a fingerprint template array specific to the individual. There are many ways of doing this; for example, the template $\{b_j'\}$ may be chosen as the array $\{b_j\}$ which is derived from the array $I_{ik}$ which produces the median value of the average intensity, $I_{av}$, across the $I_{ik}$ arrays. Methods dealing with some kind of averaging the set of arrays $\{b_j\}$ are also possible.

The next step comprises calculating a metric of comparison, L, between the template $\{b_j'\}$ and each of the arrays $\{b_j\}$ which were not used for the generation of the template. In this case we use the same approach as in some digital methods dealing with fingerprint minutiae (see, for example, U.S. Pat. No. 4,185,270 to Fisher II et al.). Roughly speaking, the metric L is the ratio of a number of peaks in a given array $\{b_j\}$ which match with the peaks in the template $\{b_j'\}$ to the total number m' of peaks in the template. This number of "matching" peaks is determined by plotting a histogram in 3D space ($\rho$, $\psi$, a). Each point of the histogram is the difference between two arbitrary vectors $b_j$ and $b_k'$ ($b_j$ is a vector from the given array and $b_k'$ is a vector from the fingerprint template), so that the point has coordinates ($\rho_j-\rho_k'$, $\psi_j-\psi_k'$, $a_j-a_k'$). The total number of points in the histogram is mxm'. In case of matching, the 3D histogram will show a cluster of points usually offset from the center. Other points are randomly distributed across the histogram. To identify the cluster, a box of proper dimensions is scanned over the histogram to a position where a maximum number of points is contained within the box. This number of points within the cluster is considered as the number of coinciding peaks. The cluster is usually offset from the histogram center because on each placing the finger on the prism, there is likely to be a shift and rotation of a fingerprint relatively to the fingerprint which has been used for generating the template. The intensity of the Fourier transform of the fingerprint image is invariant to the shift, but the rotation of the fingerprint by an angle $\psi_0$ will cause the corresponding rotation of the peaks in the Fourier domain by the same angle $\psi_0$. In this case the cluster will be shifted by $\psi_0$ from the histogram center along $\psi$ axis. Analogously, an isotropic deformation of the fingerprint would lead to the shift of the cluster along $\rho$ axis. Thus, this method of calculating the metric of comparison, L, is also invariant to a fingerprint rotation and—to a certain extent deformation (note that the isotropic deformation may arise, for example, when fingers get cold).

The next step of this embodiment deals with setting an individual threshold of verification, L*. This procedure is completely the same as it has been described for the first embodiment, that is, having calculated the values L for each array $\{b_j\}$, the processor finds a dependence of FRR on L, and, using arrays from the standard database, the processor finds a dependence of FAR on L. The threshold L* is picked either within a bandgap between FAR and FRR curves (FIG. 2) or in the vicinity of FAR/FRR intersection point. The read/write device 34 stores the template $\{b_j'\}$ and the individual threshold L*.

In verification, an array $\{f_j^v\}$ is extracted from the intensity array $I_{ik}^v$. The processor calculates the metric of comparison, L$^v$, between said array $\{b_j^v\}$ and pre-stored template $\{b_j'\}$ in the manner described above, and compares the value of L$^v$ with said pre-stored individual threshold L*. If L$^v$ is higher than L*, the verification takes place.

One of the advantages of the second embodiment is that the filesize of the stored template is small compared with said filesize in the first embodiment. However, the processing time is ordinarily longer for the second embodiment.

The present invention overcomes some drawbacks of the prior art fingerprint verification techniques.

The device proposed in the present invention does not contain a SLM and second Fourier transform lens, which makes the present device cheaper, reduces the total length of the optical system and enhances the thermal stability.

It should be noted that enroller and verifier are essentially identical in the present invention which also reduces the total cost of the device. Moreover, the template $a'_{ik}$ (or $\{b_j'\}$) and the array $a^v_{ik}$ (or $\{b_j^v\}$) are obtained in the same manner.

This means that a higher extent of matching between said arrays is expected which will improve the performance of the system.

Another advantage of the present invention is that it allows processing of an input array, unlike most prior art optical correlators. This processing overcomes to a certain extent the low consistency of the input images. Because the match analysis is performed by computer, not optically, the best metric of comparison can be defined, which is extremely difficult to implement in a purely optical systems.

For all these reasons, as well as the ability to set an individual threshold of verification, FAR and FRR are reduced.

The present invention also assures the privacy of using biometric verification techniques, because it is impossible (or, at least, very difficult) to reconstruct the original fingerprint image from the fingerprint template, even if all the details of algorithm used are known.

Comparing the second embodiment of the present invention with the digital methods dealing with fingerprint minutiae, one can see the advantages of this embodiment. The method of the present invention is invariant both to the shift and to the rotation of a fingerprint (the digital methods are non-invariant to the rotation in many cases); positions of the peaks in the Fourier spectrum exhibit higher stability both to fingerprint damages (such as cuts, abrasions, contamination, etc.) and to malfunctioning of an input device than fingerprint minutiae; the time of verification is shorter because extracting minutiae takes a longer time than locating the positions of peaks in the Fourier spectrum. On the other hand, filesizes of the stored templates are of the same order in both cases.

To assess the performance of the invention, a computer simulation was carried out using a database of fingerprint images. These images were acquired using the input mechanism shown in FIG. 1. For the simulation, all Fourier transforms and image processing steps were carried out on a standard computer.

Fingerprint images of thirty-four people (using three fingers of each person) were used. Each fingerprint was recorded between six and twelve times. Following all the steps of the method of the first embodiment of the present invention, we obtained FAR=FRR=0, which means that FAR and FRR at least do not exceed 0.002, because the total number of fingerprints used in the simulations was about 500. If we set a mutual threshold of verification instead of individual one, the FAR and FRR curves (for the whole number of trials) would intersect each other at the level 0.024. If we also generated a template for each finger using not three but one intensity array, the FAR/FRR intersection point would increase up to 0.05. If we also did not treat intensity arrays with the exponential saturation function, the FAR/FRR intersection point would be 0.11.

It should be apparent to one skilled in the art that the invention may be embodied in other specific forms without departing from the spirit or essential characteristics thereof. For example, employing the term "two-dimensional intensity distribution" does not exclude the option of registering a one-dimensional intensity array by using a cylindrical lens to collect the two-dimensional light distribution. Furthermore, one can use holographic optical elements instead of lenses throughout the invention.

We claim:

1. A hybrid optical/digital fingerprint enrolment apparatus comprising:

a source of coherent light for providing an illuminating beam along a beam path;

an input in said beam path for producing an optical signal carrying information about a fingerprint of a user along an optical signal path;

optical Fourier transform apparatus in said optical signal path for obtaining a Fourier spatial spectrum of said optical signal;

means for obtaining a digitised distribution related to a two-dimensional intensity distribution of said Fourier spatial spectrum;

means for storing said intensity-related distribution as one of a set of intensity-related distributions for said user;

means for storing a set of comparator template distributions;

means for deriving a fingerprint template distribution from said set of intensity-related distributions;

means for choosing at least two intensity-related distributions in said set of intensity-related distributions;

means for calculating a metric of comparison between each chosen intensity-related distribution and at least two comparator template distributions in said set of comparator template distributions;

means for calculating said metric of comparison between each distribution in said set of intensity-related distributions which was not used for generation of the fingerprint template distribution and said fingerprint template distribution;

means, responsive to said means for calculating a metric of comparison between each chosen integrity-related distribution and at least two comparator template distributions and responsive to said means for calculating said metric of comparison between each distribution in said set of intensity-related distributions which was not used for generation of the fingerprint template distribution and said fingerprint template distribution, for deriving a user dependent threshold of verification; and means for storing said fingerprint template distribution and said user dependent threshold of verification.

2. The apparatus of claim 1 wherein said means for calculating a metric of comparison between each chosen intensity-related distribution and at least two comparator template distributions in said set of comparator template distributions is for determining a false acceptance rate versus said metric and wherein said means for calculating said metric of comparison between each distribution in said set of intensity-related distributions which was not used for generation of the fingerprint template distribution, and said fingerprint template distribution and is for determining a false rejection rate versus said metric such that said means for deriving a user dependent threshold of verification is based on said false acceptance rate and said false rejection rate.

3. A hybrid optical/digital method of fingerprint enrolment comprising the steps of:

(a) obtaining an optical signal modulated with characteristics of a user's fingerprint;

(b) obtaining an optical Fourier spectrum of said optical signal;

(c) obtaining an array related to a two-dimensional intensity distribution of said Fourier spectrum;

(d) repeating steps (a) to (c) at least twice for said user's fingerprint in order to obtain a set of intensity-related arrays;

(e) retrieving a set of comparator template arrays;

(f) choosing at least two intensity-related arrays in said set of intensity-related array and each comparator template array in said set of comparator template arrays;

(g) calculating a metric of comparison between each chosen intensity-related array and each comparator template array in said set of comparator template arrays;

(h) generating a fingerprint template array from said set of intensity-related arrays;

(i) calculating said metric of comparison between each array in said set of intensity-related arrays which were not used for generation of the fingerprint template array and said fingerprint template array;

(j) determining a user dependent threshold of verification based on step (g) and step (i), and (k) storing said user dependent threshold of verification.

4. The method of claim 3 wherein step (c) comprises the steps of:

filtering said Fourier spectrum;

registering an intensity array related to a two-dimensional intensity distribution of said filtered Fourier spectrum;

mapping said registered intensity array, comprising the steps of:
  (i) determining an average intensity over said registered intensity array;
  (ii) dividing each element in said registered intensity array by said average intensity to obtain a normalised intensity array; and
  (iii) mapping said normalised intensity array.

5. The method of claim 4 wherein the step of mapping said normalised intensity array comprises mapping said normalised intensity array with a saturation function.

6. The method of claim 4 wherein the step of mapping said normalised intensity array comprises mapping said normalised intensity array with a binarising function.

7. The method of claim 3 wherein calculating said metric of comparison comprises calculating a relative distance between said set of intensity-related arrays and one of said fingerprint template array and said comparator template array in Hilbert space.

8. The method of claim 3 wherein step (c) includes the steps of:

filtering said Fourier spectrum;

registering an intensity array related to a two-dimensional intensity distribution of said filtered Fourier spectrum;

mapping said registered intensity array, comprising the steps of:
  (i) selecting a number of pixels of said array to generate a selected pixels intensity array;
  (ii) determining an average intensity over said selected pixels intensity array;
  (iii) dividing each element in said selected pixels intensity array by said average intensity to obtain a normalised selected pixels intensity array;
  (iv) mapping said normalised selected pixels intensity array into a mapped intensity array;
  (v) transforming said mapped intensity array to a polar co-ordinate system, the centre of which corresponds to the zeroth spatial frequency of said Fourier spectrum, to generate a polar co-ordinates intensity array, each element in said polar co-ordinates intensity array being represented by a vector comprising polar co-ordinates and a mapped intensity.

9. The method of claim 8 wherein calculating said metric of comparison comprises the steps of:

for each array in said set of intensity-related arrays which have not been used for generation of the fingerprint template array, applying a function to calculate a difference between each vector in said each array and a corresponding vector in one of said fingerprint template array and said comparator template array;

plotting each said difference in a histogram;

scanning said histogram for a cluster of plotted differences which has a maximum number of plotted differences inside a space of pre-determined size; and dividing the number of plotted differences within said cluster by the number of vectors in said one template array.

10. The method of claim 3 wherein said determining a user dependent threshold of comparison comprises the steps of:

determining a minimum false rejection rate;

determining a maximum false acceptance rate;

if said minimum false rejection rate exceeds said maximum false acceptance rate, choosing said user dependent threshold of comparison between said maximum false acceptance rate and said minimum false rejection rate, otherwise, determining a point of intersection of said false rejection rate versus said metric and false acceptance rate versus said metric and choosing said user dependent threshold of comparison proximate said point of intersection.

11. The method of claim 3 wherein the step (g) comprises determining a false acceptance rate versus said metric and wherein step (i) comprises determining a false rejection rate versus said metric such that the step of determining a user dependent threshold of verification is based on said false acceptance rate and said false rejection rate.

12. The method of claim 11 wherein said determining a false rejection rate versus said metric comprises:

sorting metrics obtained in step (i) in ascending order to generate a set of sorted metrics, each metric in said sorted set having an associated order number;

for each metric in said sorted set, dividing said order number by the number of metrics in said sorted set.

13. The method of claim 11 wherein said determining a false acceptance rate versus said metric comprises:

sorting metrics obtained in step (i) in descending order to generate a set of sorted metrics, each metric in said sorted set having an associated order number;

for each metric in said sorted set, dividing said order number by the number of metrics in said sorted set.

14. A method of fingerprint verification comprising the steps of:

(a) obtaining an optical signal modulated with characteristics of a user's fingerprint;

(b) obtaining an optical Fourier spectrum of said optical signal;

(c) obtaining an array related to a two-dimensional intensity distribution of said Fourier spectrum including the steps of:

filtering said Fourier spectrum;

registering an intensity array related to a two-dimensional distribution of said Fourier spectrum;

mapping an intensity array, comprising the steps of:
  (i) selecting a number of pixels of said array to generate a selected pixels intensity array;
  (ii) determining an average intensity over said selected pixels intensity array;
  (iii) dividing each element in said selected pixels intensity array by said average intensity to obtain a normalised selected pixels intensity array;
  (iv) mapping said normalised selected pixels intensity array into a mapped intensity array;

(v) transforming said mapped intensity array to a polar co-ordinate system, the centre of which corresponds to the zeroth spatial frequency of said Fourier spectrum, to generate a polar co-ordinates intensity array, each element in said polar co-ordinates intensity array being represented by a vector comprising polar co-ordinates and a mapped intensity;

(d) retrieving fingerprint comparison data related to said fingerprint from a data store, said fingerprint comparison data comprising a fingerprint template array and a user dependent threshold of verification;

(e) indicating one of a verification and a non-verification responsive to said intensity-related array and said fingerprint comparison data including deriving a metric of comparison between said fingerprint template array and said intensity-related array and comparing said user dependent threshold of verification with said metric.

15. The method of claim 14 wherein calculating said metric of comparison comprises the steps of:

applying a function to calculate a difference between each vector in said intensity-related array and a corresponding vector in said fingerprint template array;

plotting each said difference in a histogram;

scanning said histogram for a cluster of plotted differences which has a maximum number of plotted differences inside a space of pre-determined size; and dividing the number of plotted differences within said cluster by the number of vectors in said fingerprint template array.

16. A hybrid optical/digital fingerprint enrolment and verification system comprising:

enrolment apparatus comprising:

a source of coherent light for providing an illuminating beam along an enrolment beam path;

an input in said enrolment beam path for producing an enrolment optical signal carrying information about a fingerprint of a user along an enrolment optical signal path;

optical Fourier transform apparatus in said enrolment optical signal path for obtaining a Fourier spatial spectrum of said enrolment optical signal;

means for obtaining a digitised enrolment distribution related to a two-dimensional intensity distribution of said Fourier spatial spectrum;

means for storing said intensity-related enrolment distribution as one of a set of intensity-related enrolment distributions for said user;

means for storing a set of comparator template distributions;

means for deriving a fingerprint template distribution from said set of intensity-related enrolment distributions;

means for choosing at least two intensity-related enrolment distributions in said set of intensity-related enrolment distributions;

means for calculating an enrolment metric of comparison between each chosen intensity-related enrolment distribution and at least two comparator template distributions in said set of comparator template distributions;

means for calculating said enrolment metric of comparison between each distribution in said set of intensity-related distributions which was not used for generation of the fingerprint template distribution and said fingerprint template distribution;

means, responsive to said means for calculating an enrolment metric of comparison between each chosen intensity-related enrolment distribution and at least two comparator template distributions and responsive to said means for calculating said enrolment metric of comparison between each distribution in said set of intensity-related distributions which was not used for generation of the fingerprint template distribution, and said fingerprint template distribution for deriving a user dependent threshold of verification; and storage means for storing said fingerprint template distribution and said user dependent threshold of verification; and verification apparatus, comprising:

a source of coherent light for providing an illuminating beam along a verification beam path;

an input in said verification beam path for producing a verification optical signal carrying information about a fingerprint along a verification optical signal path;

optical Fourier transform apparatus in said verification optical signal path for obtaining a verification Fourier spatial spectrum of said verification optical signal;

means for obtaining a verification digitised distribution related to a two-dimensional intensity distribution of said verification Fourier spatial spectrum;

means for retrieving said fingerprint template distribution from storage;

means for calculating a verification metric of comparison between said obtained verification digitised distribution and said fingerprint template distribution;

means for retrieving said user dependent threshold of verification from storage;

means for comparing said verification metric of comparison with said user dependent threshold of verification; and means for indicating one of a verification and a non-verification responsive to said means for comparing.

17. The apparatus of claim 16 wherein said means for calculating an enrolment metric of comparison between each chosen intensity-related distribution and at least two comparator template distributions in said set of comparator template distributions is for determining a false acceptance rate versus said enrolment metric and wherein said means for calculating said metric of comparison between each distribution in said set of intensity-related distributions which was not used for generation of the fingerprint template distribution and said fingerprint template distribution and is for determining a false rejection rate versus said metric such that said means for deriving a user dependent threshold of verification is based on said false acceptance rate and said false rejection rate.

18. A hybrid digital-optical method of fingerprint enrolment and verification comprising:

(a) obtaining an optical signal modulated with characteristics of a user's fingerprint;

(b) obtaining an optical Fourier spectrum of said optical signal;

(c) obtaining an array related to a two-dimensional intensity distribution of said Fourier spectrum;

(d) repeating steps (a) to (c) at least twice for said user's fingerprint in order to obtain a set of intensity-related arrays;

(e) generating a fingerprint template array from said set of intensity-related arrays;

(f) retrieving a set of comparator template arrays;

(g) choosing at least two intensity-related arrays in said set of intensity-related arrays;

(h) calculating a metric of comparison between each chosen intensity-related array and each comparator template array in said set of comparator template arrays;

(i) calculating said metric of comparison between each array in said set of intensity-related arrays which were not used for generation of the fingerprint template array and said fingerprint template array;

(j) determining a user dependent threshold of verification based on step (h) and step (i);

(k) storing said user dependent threshold of verification and said fingerprint template array;

(l) obtaining a verification optical signal modulated with characteristics of a user's fingerprint;

(m) obtaining a verification optical Fourier spectrum of said verification optical signal;

(n) obtaining a verification array related to a two-dimensional intensity distribution of said verification Fourier spectrum;

(o) retrieving said fingerprint template array and said user dependent threshold of verification; and (p) deriving a verification metric of comparison between said fingerprint template array and said intensity-related verification array and comparing said user dependent threshold of verification with said verification metric and indicating one of a verification and a non-verification.

* * * * *